United States Patent
Rosay

(10) Patent No.: US 8,984,315 B2
(45) Date of Patent: Mar. 17, 2015

(54) METHOD AND SYSTEM FOR ADJUSTING THE OPERATION MODE OF A MULTICORE DATA PROCESSING DEVICE

(75) Inventor: Arnaud Rosay, Voivres les le Mans (FR)

(73) Assignee: ST-Ericsson (France) SAS, Grenoble (FR)

( * ) Notice: Subject to any disclaimer, the term of this patent is extended or adjusted under 35 U.S.C. 154(b) by 487 days.

(21) Appl. No.: 13/146,360

(22) PCT Filed: Jan. 28, 2010

(86) PCT No.: PCT/EP2010/050976
§ 371 (c)(1),
(2), (4) Date: Aug. 29, 2011

(87) PCT Pub. No.: WO2010/086354
PCT Pub. Date: Aug. 5, 2010

(65) Prior Publication Data
US 2011/0302438 A1 Dec. 8, 2011

(30) Foreign Application Priority Data
Jan. 30, 2009 (FR) .................................... 09 50607

(51) Int. Cl.
*G06F 1/00* (2006.01)
*G06F 1/32* (2006.01)

(52) U.S. Cl.
CPC .............. *G06F 1/3203* (2013.01); *G06F 1/329* (2013.01); *Y02B 60/144* (2013.01)
USPC .......................................................... 713/323

(58) Field of Classification Search
CPC ..................................................... G06F 1/3203
USPC .......................................................... 713/323
See application file for complete search history.

(56) References Cited

U.S. PATENT DOCUMENTS

| | | | |
|---|---|---|---|
| 6,189,107 B1 * | 2/2001 | Kim et al. ...................... | 713/300 |
| 8,064,197 B2 * | 11/2011 | Mowry et al. ............ | 361/679.53 |
| 8,090,965 B1 * | 1/2012 | Chakravarty ................. | 713/300 |
| 8,213,865 B2 * | 7/2012 | Jensen ......................... | 455/41.3 |
| 2003/0188077 A1 * | 10/2003 | Watts et al. ................... | 710/313 |
| 2004/0083478 A1 | 4/2004 | Chen et al. | |
| 2006/0010333 A1 * | 1/2006 | Rhodes et al. ................ | 713/330 |
| 2006/0026447 A1 | 2/2006 | Naveh et al. | |
| 2006/0095807 A1 * | 5/2006 | Grochowski et al. ......... | 713/324 |
| 2007/0150759 A1 | 6/2007 | Srinivasan et al. | |

* cited by examiner

*Primary Examiner* — Mohammed Rehman
(74) *Attorney, Agent, or Firm* — Coats & Bennett, P.L.L.C.

(57) ABSTRACT

The data processing device comprising at least two processing units, each processing unit (CR1, CR2) being alternately in a first operating mode and in a second operating mode, each processing unit switching to its second operating mode at the end of a transient phase (PHT1, PHT2) comprising at least one activation of resources common to these two processing units; at least one of the two units is configured to switch at least once to its second operating mode with a temporal flexibility, and the instant of switching to its second operating mode, of the processing unit or units exhibiting the said flexibility, is adjusted in such a way that the two units are in their second operating mode after the said common resources have been activated once (26) in the course of the two respective transient phases, if this temporal adjustment is compatible with the said temporal flexibility.

14 Claims, 4 Drawing Sheets

Figure 1:
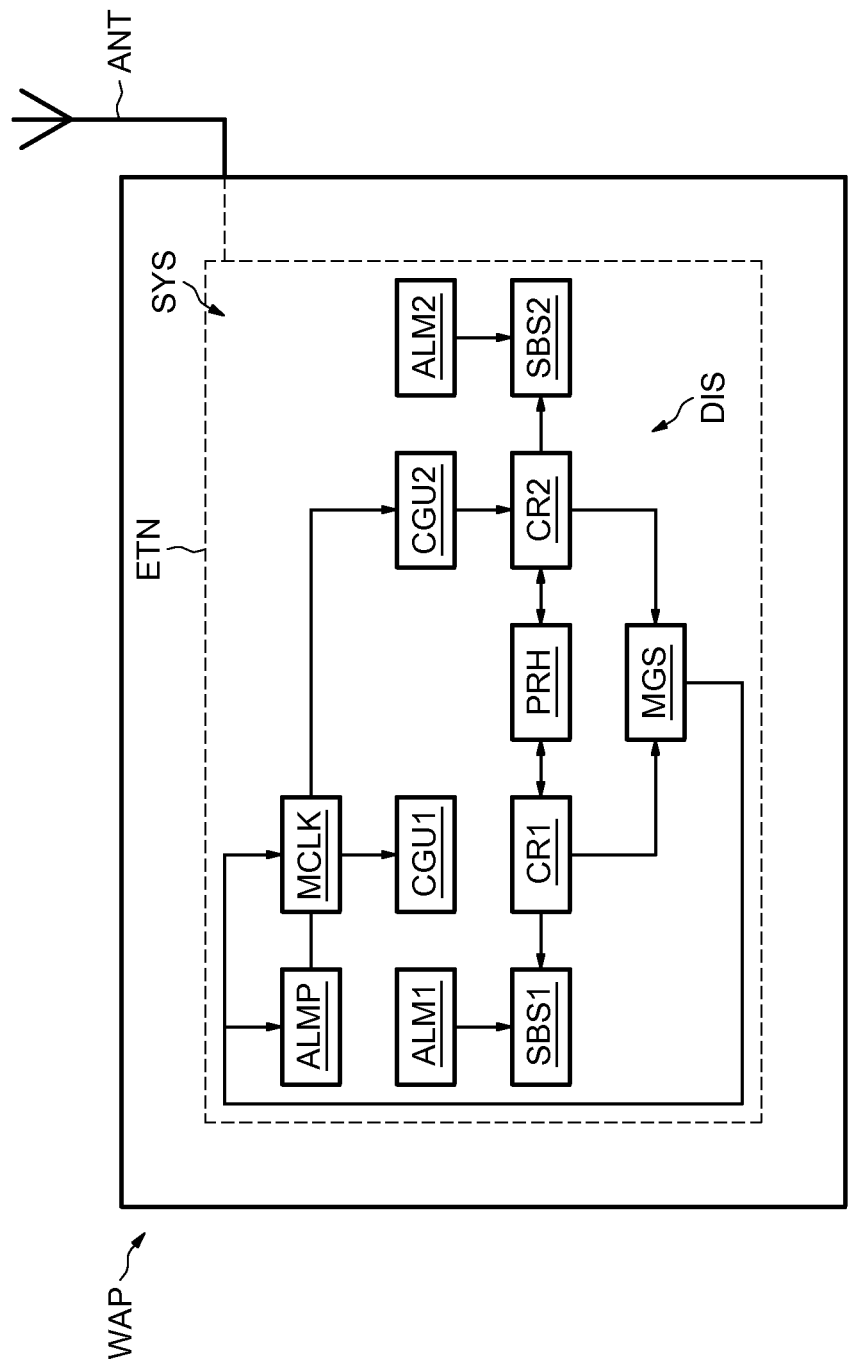

METHOD AND SYSTEM FOR ADJUSTING THE OPERATION MODE OF A MULTICORE DATA PROCESSING DEVICE

THE FIELD OF INVENTION

The invention relates to multicore or multi processing unit data processing devices, and more particularly to the management of their operation so as to reduce their electrical consumption.

BACKGROUND

The invention applies advantageously but non-limitingly to apparatuses operating with an autonomous power supply, such as for example rechargeable batteries, and incorporating such devices. Wireless communication apparatuses, such as for example cellular mobile telephones or personal navigation devices, may be cited by way of indication.

Portable apparatuses are offering more and more services. This is true in particular for cellular mobile telephones which are incorporating numerous new multimedia applications such as Java applications, generation of polyphonic sounds, video functions, a digital camera, incorporated television functions, etc.

This escalation of new applications requires greater processing power, and this may be obtained in particular by data processing devices comprising several processing units such as processor cores.

But, an increase in processing power generally coincides with an increase in energy consumption.

This of course has a direct impact on the autonomy of the batteries.

A conventional energy reduction mechanism consists in placing a processing unit in a low consumption mode when this processing unit no longer has to perform any processing. And, each time that a processing is required, the processing unit exits its low consumption mode, performs the processing and re-enters the low consumption mode until the next processing required.

But, entry to and exit from the low consumption mode consume energy.

And, this consumed energy is all the more significant in multicore devices in which each core enters and exits its low consumption mode independently.

SUMMARY

According to one mode of implementation and embodiment, there is proposed a method and a system making it possible to reduce the energy consumption of a multicore processing device, and making it possible for example to increase the autonomy if a cellular mobile telephone while having only a relatively small impact on the cost of the product.

According to one aspect, there is proposed a method for managing the operation of a data processing device comprising at least two processing units.

Each processing unit is alternately in a first operating mode, for example a very low consumption sleep mode, and in a second operating mode, for example an active mode; each processing unit switches to its second operating mode at the end of a transient phase comprising at least one activation of resources common to these two processing units, for example a main power supply and master clock activation; in this method, at least one of the two units is configured to switch at least once, and preferably several times or indeed each time, to its second operating mode with a temporal flexibility, and the instant of switching to its second operating mode of the processing unit or units exhibiting the said flexibility is adjusted in such a way that the two units are in their second operating mode after the said common resources have been activated once in the course of the two respective transient phases, if this temporal adjustment is compatible with the said temporal flexibility.

Thus, for example, when one of the cores is already in its second operating mode, the common resources have already been activated. And, when the other core has to wake up, and when it is possible for example to advance or to delay this wakeup having regard to the flexibility of this core, to an instant where the first core is still in activity, it is then no longer necessary for this second core to activate the common resources since they already have been. It will perhaps be necessary only to activate the resources specific to this second core. The energy which would have been consumed were the second core to have been woken up, such as initially envisaged, while the first core is asleep, will therefore thus be saved.

Of course, if it is not possible to perform this temporal adjustment in such a way as to have some sort of an overlap of the activities of the two cores (thereby making it possible to activate the common resources just once), then there is no energy saving.

That said, the temporal flexibility of at least one of the cores makes it possible at least in certain cases to ensure this energy saving. This will be all the easier when both cores offer temporal flexibilities.

This temporal flexibility can be provided in the form of a flexibility indication contained in a temporal constraint cue delivered by the core concerned.

Thus, according to a mode of implementation, each processing unit provides before switching to its first operating mode a temporal constraint cue relating to its next switch to its second operating mode, and at least one of these temporal constraint cues contains a flexibility indication for the said temporal constraints; the instant of switching of at least one of these two processing units to its second operating mode is then adjusted in such a way that the two units are in their second operating mode after the said common resources have been activated once in the course of the two respective transient phases, if this temporal adjustment is compatible with the said temporal constraint cues delivered by the two processing units having regard to the flexibility indication or indications.

It may also transpire that the two processing units cooperate with shared resources, for example with a peripheral comprising configuration registers and performing direct memory accesses ("DMA", an acronym well known to those skilled in the art). It turns out to be advantageous to optimize the control of this peripheral so as to save energy when the cores switch to their sleep mode. Indeed, in the case of a peripheral such as that indicated above, it may be necessary, before halting this peripheral, to perform a procedure for saving the configuration registers. But, if one of the cores has terminated its processings and decides to re-enter its sleep mode, it is futile for it to perform a backup of these registers as long as the other core is still using these registers, possibly to store other data therein. Thus, the backup procedure will be performed once when the second core has terminated its processings and has to re-enter its sleep mode. Thus, therefore, the energy consumed during a backup procedure is saved, since just one of them is performed for both cores.

More generally, according to a mode of implementation, when the two processing units are both in their second operating mode and each cooperate with shared resources intended to be halted according to a shutdown procedure upon the return of the units to their first operating mode, this shutdown procedure is triggered just once for the two units when neither of the two units cooperates with these shared resources.

According to another aspect, there is proposed a system comprising a data processing device comprising at least two processing units, each processing unit being configured to be alternately in a first operating mode and in a second operating mode, at least one of the two units being furthermore configured to switch at least once to its second operating mode with a temporal flexibility; there are also provided resources common to these two processing units configured to be activated during a transient phase preceding, for each processing unit, its switch to its second operating mode, and management means configured to adjust the instant of switching to its second operating mode of the processing unit or units exhibiting the said flexibility in such a way that the two units are in their second operating mode while activating the said common resources once in the course of the two respective transient phases, if this temporal adjustment is compatible with the said temporal flexibility.

According to one embodiment each processing unit is configured to provide before switching to its first operating mode a temporal constraint cue relating to its next switch to its second operating mode, at least one of these temporal cues containing a flexibility indication for the said temporal constraints, and the management means are configured to receive the said temporal constraint cues and to adjust the instant of switching of at least one of these two processing units to its second operating mode in such a way that the two units are in their second operating mode while activating the said common resources once in the course of the two respective transient phases, if this temporal adjustment is compatible with the said temporal constraint cues having regard to the flexibility indication or indications.

According to one embodiment, the system comprises shared resources configured to cooperate with the two processing units and to be halted according to a shutdown procedure upon the return of the units to their first operating mode, and the management means are furthermore configured to, when the two processing units are both in their second operating mode and each cooperate with the said shared resources, trigger the said shutdown procedure just once for the two units when neither of the two units cooperates with these shared resources any longer.

According to another aspect, there is also proposed an apparatus, for example a wireless communication apparatus, capable of operating with an autonomous power supply, for example a battery, and incorporating a system such as defined above.

Figure 2:
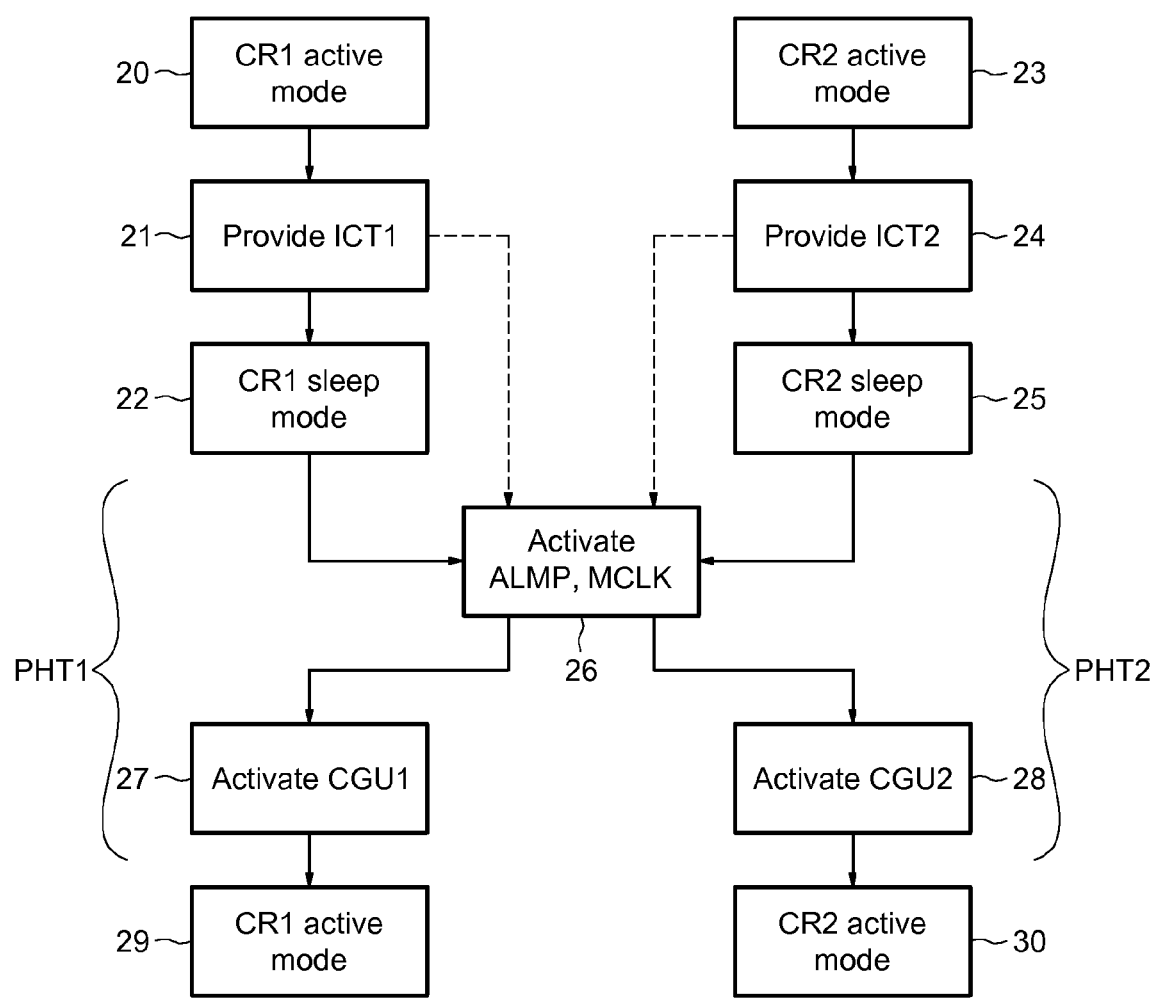
Figure 3:
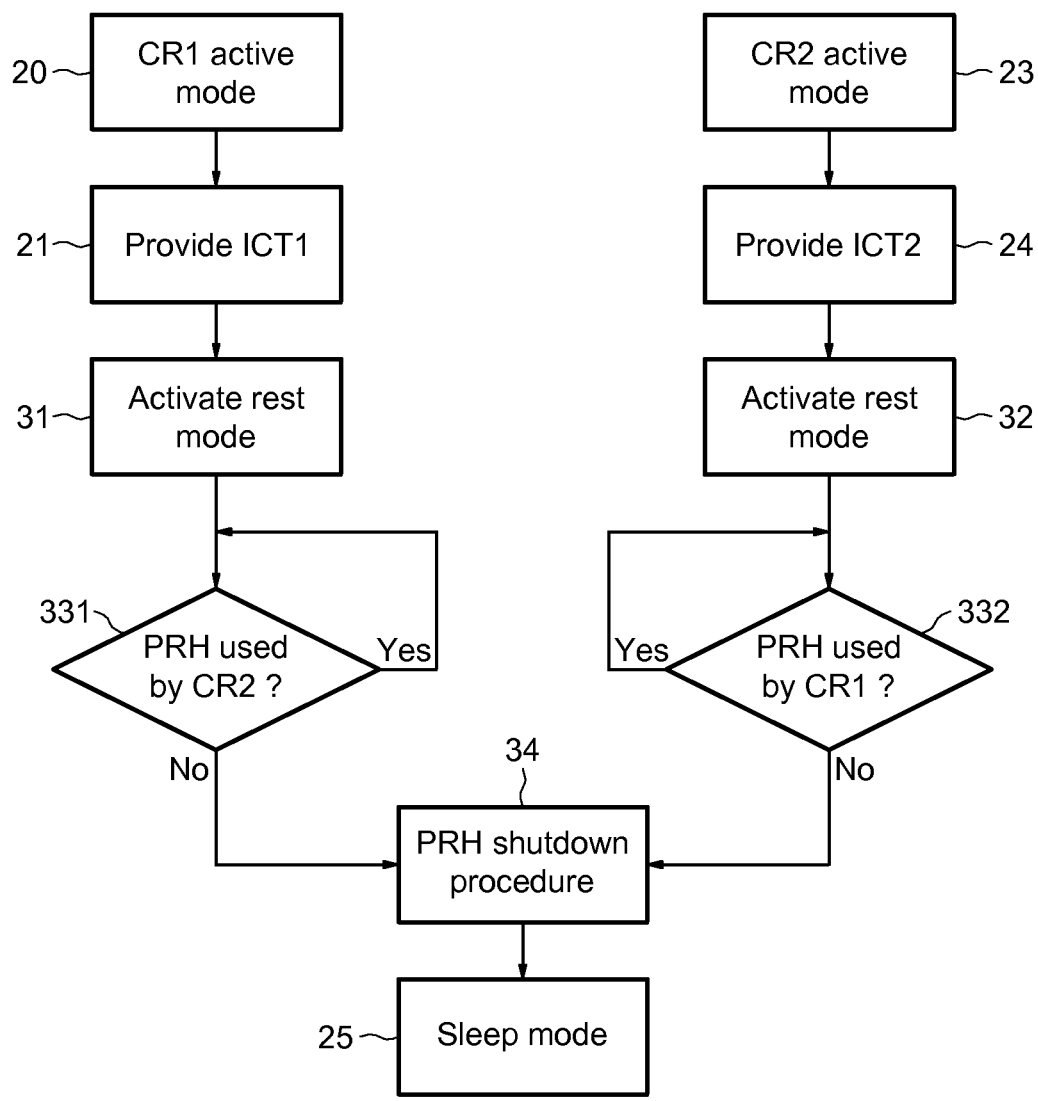
Figure 4:
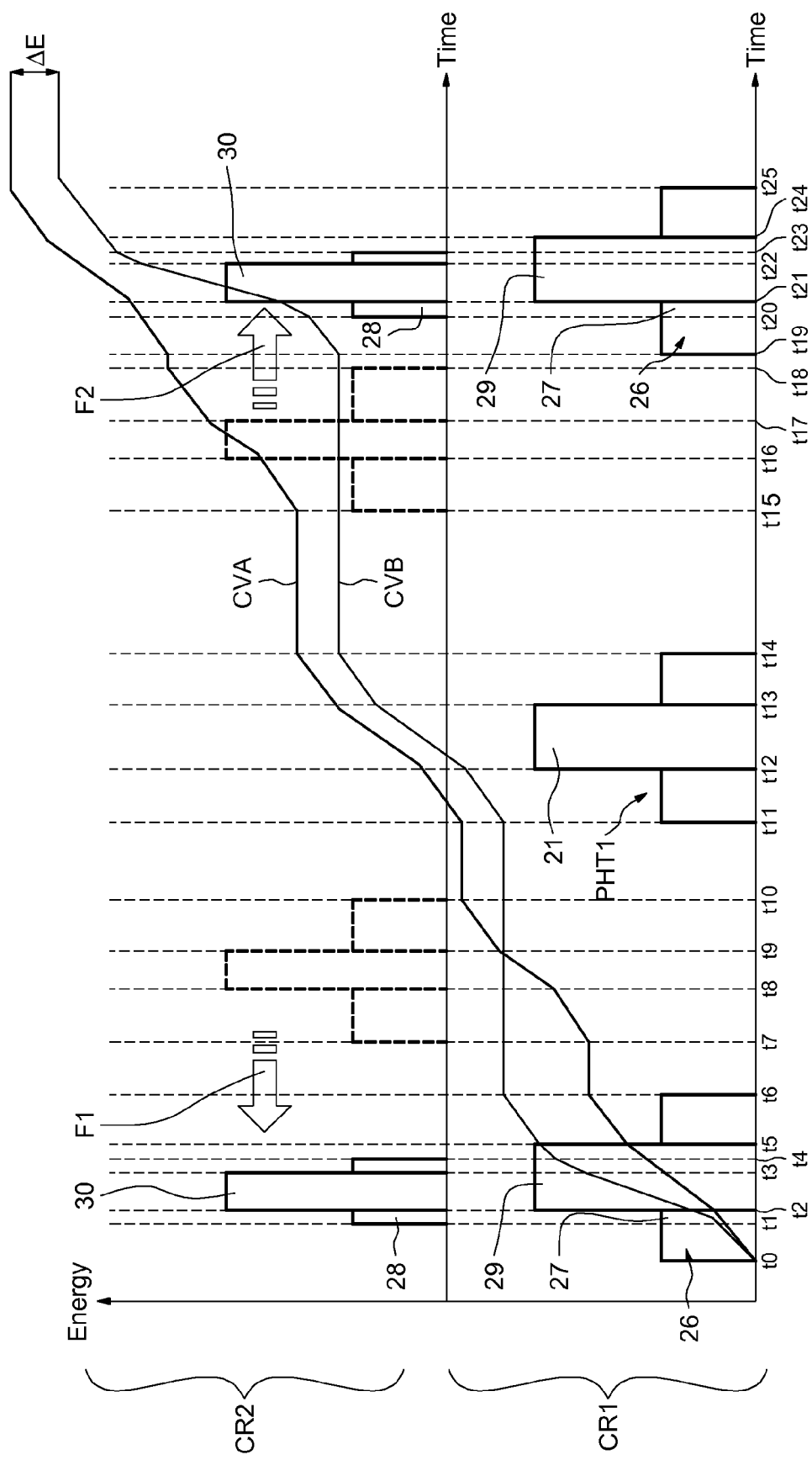

Other advantages and characteristics of the invention will be apparent on examining the detailed description of wholly non-limiting modes of implementation and embodiments and the adjoined drawings in which:

FIG. 1 illustrates in a very schematic manner an embodiment of a system according to the invention, and FIGS. 2 to 4 schematically illustrate various modes of implementation of the method according to the invention.

DETAILED DESCRIPTION

In FIG. 1, the reference SYS designates a system comprising a multicore or multiprocessor data processing device DIS as well as means MGS configured to manage the operation of the device, in particular to reduce the energy consumption during switches from the sleep modes to the active modes of the various cores.

In FIG. 1, for the sake of simplification only two processing units with the cores CR1, CR2 have been represented, although the invention also applies to multicore devices having a larger number of processing cores.

The system SYS can be for example incorporated within the digital stage ETN coupled to the antenna ANT by an analogue stage (not represented here for the sake of simplification) of a WAP wireless communication apparatus, such as a cellular mobile telephone.

In FIG. 1, the two cores CR1 and CR2 use common resources such as for example a main power supply ALMP and a block MCLK able to generate a master clock signal, this block MCLK being intended to be powered by the block ALMP.

In addition to these common resources, each core CR1, CR2 possesses inherent resources represented here by blocks CGU1 and CGU2. These blocks are also clock generation blocks and can comprise phase-locked loops.

In the example which is described here, each core CR1, CR2 furthermore controls a sub-system SBS1, SBS2 powered by an inherent power supply ALM1, ALM2.

Moreover, in this example, the two cores, CR1, CR2, cooperate with shared resources PRH such as for example a peripheral including configuration registers and capable of performing direct memory accesses (DMA).

The management means MGS, the function of which will be returned to in greater detail hereinafter, are represented here as means external to the cores CR1, CR2. These means can be effected in a software manner within a microcontroller or else in the form of logic circuits. That said, it is entirely conceivable for these means MGS to be incorporated, for example in software form, within one of the cores.

Each core possesses a first operating mode, for example a sleep mode in which all the clock generating blocks as well as all the power supplies are halted.

Each core moreover possesses a second operating mode, for example an active mode in which it executes the various processings which are allocated to it by using for example the means contained in the associated sub-system as well as the shared resources PRH.

The switch from the first mode to the second mode comprises, for each core, a transient phase in the course of which the management means MGS will activate the common resources ALMP and MCLK and then the resources specific to the core concerned, for example the resources CGU1 for the core CR1.

Thus, more precisely, during this transient phase, the main power supply ALMP is activated and there is a wait until this power supply stabilizes. Next, there is a wait until the clock signal generated by the block MCLK becomes steady. At that moment, the phase-locked loop of each block CGU1 can be activated and there is a wait until this loop is locked. It is at that moment that the core CR1 switches to its active mode (second operating mode) to begin executing the envisaged instructions.

The individual power supplies ALM1 and ALM2 are also activated and the sub-systems SBS1, SBS2 can begin operating when these individual power supplies have become stable.

Each core will be alternately in its sleep mode or in its active mode.

Before a core leaves the active mode to re-enter the sleep mode, it will provide the management means MGS with a temporal constraint cue relating to its next switch to its second operating mode (active mode).

This temporal constraint cue defines for example the duration for which the core must remain in its sleep mode and the duration of the next active mode. Such a temporal constraint cue can also comprise a flexibility indication. This is the case for example when certain processings performed by the core are not real-time processings. The flexibility indication can take various forms. For instance, the core will be able to indicate the authorized maximum duration for which it can remain in sleep mode as well as the variation in duration which is acceptable for the core to perform its activities in the active mode.

As a function of these temporal constraint cues, at least one of them being adjoined to a flexibility indication, the management means MGS will then, if possible, adjust the instant of switching of at least one of these two cores to its second operating mode (and therefore adjust the instants of activation of the means implemented in the transient phase between the first mode and the second mode) so as to obtain a certain overlap of the activities of the two cores, thereby making it possible to activate the common resources just once, in this instance the blocks ALMP and MCLK.

This is illustrated in greater detail in FIG. 2.

In this figure, in steps 20 and 23, the cores CR1 and CR2 are both in their active mode.

Before a core switches to its sleep mode (step 22 and step 25), the latter provides (step 21 and step 24) the temporal constraint cue ICT1, ICT2.

The management means MGS will then undertake an analysis of these cues ICT1 and ICT2 so as to adjust, if possible, the instant of switching of at least one of the cores to its active mode in such a way that the two cores CR1 and CR2 are in their active mode at the end of their corresponding transient phases PHT1 and PHT2 while having activated the common resources ALMP and MCLK just once (step 26) in the course of these two transient phases.

When these common resources have been activated, the activation of the inherent resources CGU1, CGU2 of each of the cores is undertaken (steps 27 and 28), thus bringing these two cores into their active modes 29, 30.

What has just been described in relation to FIG. 2 applies in the case where one wishes to switch the two cores to their active mode whilst they are both asleep, or else in the case where one wishes to switch one core from its sleep mode to its active mode whilst the other core is already in its active mode.

An exemplary implementation of such a method is illustrated in FIG. 4.

In this figure, it is assumed that the core CR1 has frozen temporal constraints, that is to say non-flexible constraints, whereas the temporal constraints of the core CR2 are assumed to be flexible.

Furthermore, for the sake of simplification, it will be assumed that the durations of activation of the blocks CGU1 and CGU2 (steps 27 and 28) are identical, though they could of course be different.

In this example, before switching to its first operating mode (sleep mode), the core CR1 has indicated that it should be in its next active mode 29 between the instants t2 and t5. Therefore, the management means MGS have activated (step 26) the common resources ALMP and MCLK at the instant t0 and the activation 27 of the block CGU1 has occurred at the instant t1 in such a way that the core can enter its active mode at the instant t2.

Moreover, the core CR2, before switching to its sleep mode, has indicated to the management means MGS that it should be in its next active mode between the instants t8 and t9, but that these temporal constraint cues were supplemented with a flexibility indication making it possible to shift temporally towards the left (arrow F1), for example to the instant t2, the instant of switching of the core CR2 to the active mode.

Having regard to these indications, the management means MGS have adjusted this instant of switching to the active mode of the core CR2 to the instant t2. But, in order for the core CR2 to switch to its active mode, it is necessary to activate the common resources 26 as well as the block CGU2. But, since the core CR1 is also in its active mode at the instant t2, it suffices to activate the common resources once (step 26) between the instants t0 and t1, for both cores.

After this activation 26, the activation 28 of the block CGU2 associated with the core CR2 is undertaken so as to switch the latter to its active mode 30.

It is seen immediately in this FIG. 4 that if the instant of switching of the core CR2 to its active mode had not been shifted towards the left, and that it had been left at the instant t8, it would have been necessary, in order to switch this core CR2 to the active mode, to activate the common resources from the instant t7. There would therefore have been a first activation of the common resources at the instant t0 for the core CR1 and a second activation of the common resources at the instant t7 for the core CR2.

The fact of having shifted the instant of switching of the core CR2 to the active mode towards the left to the instant t2, has resulted in saving an activation of the common resources.

Before switching back to its sleep mode, the core CR1 indicates to the management means that the next switch to its active mode 29 should be performed at the instant t12. Therefore, the management means trigger the transient phase PHT1 at the instant t11.

For its part, the core CR2 has indicated to the management means that its next switch to its active mode should be performed at the instant t16 but that this temporal constraint cue was supplemented with a flexibility indication allowing a shift towards the right (arrow F2) of the instant of switching to the active mode 30.

But, moreover, the core CR1 has indicated to the management means before switching back to its sleep mode, that it should switch back to its active mode at the instant t21.

And, this instant t21 lies in the span of flexibility of the switching of the core CR2 to its active mode.

Consequently, the management means decide to shift the instant of switching of the core CR2 to its active mode from the instant t16 to the instant t21. Thus, in a manner analogous to what was explained above, it is necessary to activate the common resources just once (step 26) in the course of the two transient phases respectively associated with the switches of the two cores to their second operating mode (active mode).

Here again, the energy consumed during a phase of activation of the common resources is saved with respect to a situation in which the core CR2 would have been allowed to switch to its active mode at the instant t16 (resulting in an activation of the common resources for this core CR2 at the instant t15).

Although this figure has shown instants of switching to the active mode which are aligned for the two cores, this is not indispensable. Indeed, even if the management means had shifted towards the left the instant of switching of the core CR2 to its active mode, from the instant t8 to the instant t3 for example, the activation of the common resources for the core CR2 would also have been saved since at this instant the core CR1 is still in its active mode and consequently the already activated common resources are still running.

Of course, at each switch of a core to its active mode, the management means inform this core of the duration for which it has been in its sleep mode in such a way that the counters of the core can be updated having regard to its effective duration of sleep.

Though it has just been seen that it is possible to save energy on entry to the active mode, it is also possible, as illustrated in FIG. 3, to save energy when a core leaves its active mode, in particular when the two cores cooperate with shared resources that are halted at the end of a specific shutdown procedure, for example a procedure requiring a backup of the configuration registers of the peripheral.

When a core wishes to enter a sleep mode, it provides as indicated above, the temporal constraints cue (steps 20, 21, 23 and 24) and will then enter, in the example described here, a "rest" mode (steps 31 and 32) beforehand. In this mode, the resources used solely by the core in question, for example the resources contained in the sub-system SBS1 (SBS2) will be deactivated, possibly by applying shutdown procedures such as for example registers backup procedures.

On the other hand, in this rest mode, the resources PRH shared by the two cores are not deactivated.

In this regard, it is determined, before performing the procedure for shutting down the shared resources comprising for example a registers backup procedure, whether these shared resources are still being used by one of the two cores.

If such is the case, the core which is no longer using these shared resources will not perform this shutdown procedure, for example the procedure for backing up configuration registers, since the data in these configuration registers will still be able to change as long as the other core has not stopped using this peripheral. And, it is only when neither of the two cores is using the shared peripheral any longer, that the procedure 34 for shutting down the shared resource will then be undertaken once thus bringing the cores to their sleep mode (step 35).

Such a shutdown procedure, for example a registers backup procedure, consumes energy. Hence, the fact of performing it just once for the two cores allows a saving of energy in re-entry to the sleep mode.

This is also illustrated in FIG. 4.

It is seen for example that the core CR2 deactivates the resources that it itself controls between the instants t3 and t4, this of course consuming energy. On the other hand, since the core CR1 is still in active mode and is using the shared resource PRH, the deactivation of the resources which is controlled solely by the core CR1 as well as the deactivation of the shared resource are performed between the instants t5 and t6.

Therefore, the shutdown procedure (backing up of registers) for the peripheral PRH is performed just once instead of twice (between the instants t5 and t6 and between the instants t9 and t10) if the instant of switching of the core CR2 to its active mode has not been shifted towards the left.

Such an energy saving is also found between the instants t22 and t25 since here again, the core CR1 performs the backup procedure just once in the time span between the instants t24 and t25.

It is thus possible to effect an overall energy saving ΔE as illustrated in FIG. 4, between a configuration without shift according to the arrows F1 and F2 (curve CVA of energy consumed) and the configuration with shift according to the arrows F1 and F2 (curve CVB of energy consumed).

The invention is not limited to the modes of implementation and embodiment which have just been described but embrace all variants thereof.

Thus it is not indispensable for each core to provide temporal constraint cues in as much as at least one of them exhibits a temporal flexibility for at least one of these switches to its second mode (active mode).

Indeed if a core executes only activities which do not support any temporal shift of their executions, then this core could, instead of delivering temporal constraint cues before going to sleep, even rigid ones, that is to say non-flexible ones, deliver at the moment it wakes up, a signal indicating this wakeup. In this case the management means can try to adjust the wakeup of the other core having regard to its flexibility. Stated otherwise according to this simplified version, one of the cores provides a temporal constraint cue while the other indicates only whether or not it is active.

Moreover, what has just been described with two processing units can be generalized to more than two processing units cooperating together with common resources and/or shared resources or else of which groups of at least two units cooperate with common and/or shared resources.

The invention claimed is:

1. A method of managing the operation of a data processing device comprising at least two processing units, each processing unit operating alternately in a first operating mode and in a second operating mode, comprising:
   initiating a first transient phase during which one or more common resources of the two processing units are activated;
   switching the first processing unit to its second operating mode at the end of the first transient phase after the one or more common resources have been activated;
   and
   switching the second processing unit to its second operating mode at the end of a second transient phase according to a temporal flexibility, wherein the instant of switching the second processing unit to its second operating mode is adjusted such that the two processing units are in their second operating modes after the one or more common resources have been activated once in the course of the two respective transient phases.

2. The method of claim 1 further comprising:
   providing, by the second processing unit, before switching to its first operating mode, a temporal constraint cue relating to its next switch to its second operating mode, the temporal constraint cue containing a flexibility indication for the temporal constraint; and
   wherein the instant of switching of the second processing unit to its second operating mode is adjusted in such a way that the two processing units are in their second operating mode after the common resources have been activated once in the course of the two respective transient phases, if this temporal adjustment is compatible with the temporal constraint cue delivered by the second processing unit having regard to the flexibility indication.

3. The method of claim 1 wherein, when the two processing units are both in their second operating mode and each cooperate with shared resources intended to be halted according to a shutdown procedure upon the return of the units to their first operating mode, this shutdown procedure is triggered just once for the two processing units when neither of the two units cooperates with these shared resources.

4. A data processing system, comprising:
   first and second processing units, each processing unit being configured to operate alternately in a first operating mode and in a second operating mode, at least one of the two units being furthermore configured to switch at least once to its second operating mode with a temporal flexibility;

one or more resources common to the first and second processing units configured to be activated during a first transient phase;

wherein one of the two processing units is further configured to switch to its second operating mode at the end of the first transient phase after the one or more common resources have been activated; and a management module configured to adjust the instant of switching the other one of the two processing units to its second operating mode at the end of a second transient phase, according to the temporal flexibility such that the first and second processing units are in their second operating mode after the one or more common resources have been activated once in the course of the two respective transient phases.

5. The system of claim 4,
wherein at least one of the first and second processing units are configured to provide, before switching to its first operating mode, a temporal constraint cue relating to its next switch to its second operating mode;
wherein at least one of the temporal cues contains a flexibility indication for the temporal constraint; and
wherein the management module is further configured to receive the temporal constraint cues and to adjust the instant of switching of at least one of the first and second processing units to its second operating mode in such a way that the first and second processing units are in their second operating mode while activating the common resources once in the course of the two respective transient phases.

6. The system of claim 4 further comprising:
shared resources configured to cooperate with the first and second processing units and to be halted according to a shutdown procedure upon the return of the first and second processing units to their first operating mode; and
wherein, when the first and second processing units are both in their second operating mode and each cooperate with the said shared resources, the management module is further configured to trigger the shutdown procedure once for the first and second processing units when neither of the first or second processing units continues to cooperate with the shared resources.

7. The system of claim 4 further comprising an autonomous power supply operative to power the first and second processing units.

8. The system of claim 4 further comprising a transceiver and wherein the data processing system is operative to control the transceiver to implement a wireless communication apparatus.

9. A method for managing the operation of a multicore data processing device comprising at least two processing cores, each processing core being alternately in a first operating mode and in a second operating mode, the method comprising:
for each processing core, switching the processing core to its second operating mode at the end of a transient phase, said transient phase comprising activating at least one resource common to these two processing cores,
switching at least one of said at least two cores at least once to its second operating mode with a temporal flexibility,
for each processing core, before switching to its first operating mode, providing a temporal constraint cue relating to its next switch to its second operating mode, said temporal constraint cue defining the duration for which the core must remain in its first operating mode and the duration of the next second operating mode, the temporal constraint cue containing a flexibility indication for the temporal constraint forming said temporal flexibility, and
for each processing core or cores exhibiting said temporal flexibility, adjusting the instant of switching to its second operating mode in such a way that the two cores are in their second operating mode after the common resources have been activated once in the course of the two respective transient phases, if this temporal adjustment is compatible with the temporal constraint cue delivered by the two processing cores having regard to the flexibility indication or indications.

10. The method of claim 9 wherein, when the two processing cores are both in their second operating mode and each cooperates with shared resources intended to be halted according to a shutdown procedure upon the return of the cores to their first operating mode, triggering this shutdown procedure just once for the two cores when neither of the two cores cooperates with these shared resources.

11. A system comprising a multicore data processing device comprising:
at least two processing cores, each processing core being configured to be alternately in a first operating mode and in a second operating mode, at least one of said at least two cores being furthermore configured to switch at least once to its second operating mode with a temporal flexibility,
each processing core being configured to provide before switching to its first operating mode a temporal constraint cue relating to its next switch to its second operating mode, said temporal constraint cue defining the duration for which the core must remain in its first operating mode and the duration of the next second operating mode, at least one of these temporal constraint cues containing a flexibility indication for the said temporal constraints forming said temporal flexibility,
resources common to these two processing cores configured to be activated during a transient phase preceding, for each processing core, its switch to its second operating mode, and
a management module configured to receive the said temporal constraint cues and to adjust the instant of switching to its second operating mode, of the processing core or cores exhibiting the said flexibility in such a way that the two cores are in their second operating mode while activating the said common resources once in the course of the two respective transient phases, if this temporal adjustment is compatible with the said temporal constraint cues having regard to the flexibility indication or indications.

12. The system of claim 11, furthermore comprising shared resources configured to cooperate with the two processing cores and to be halted according to a shutdown procedure upon the return of the cores to their first operating mode, and in which the management module are furthermore configured to, when the two processing cores are both in their second operating mode and each cooperate with the said shared resources, trigger the said shutdown procedure just once for the two cores when neither of the two cores cooperates with these shared resources any longer.

13. The system of claim 11 further comprising an autonomous power supply operative to power the first and second processing units.

14. The system of claim 11 further comprising a transceiver and wherein the data processing system is operative to control the transceiver to implement a wireless communication apparatus.

* * * * *